United States Patent Office 2,824,279
Patented Feb. 18, 1958

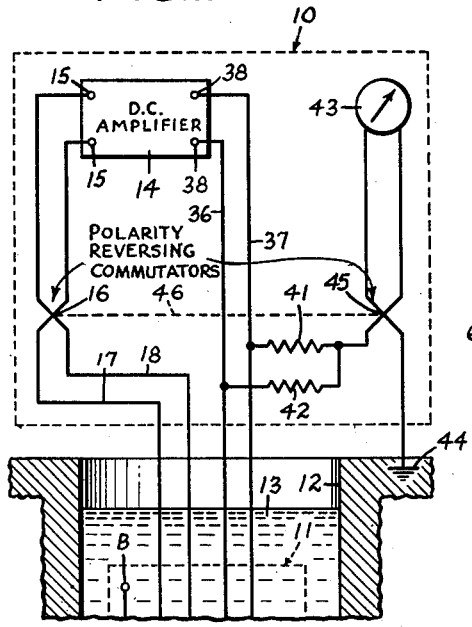
FIG.1.
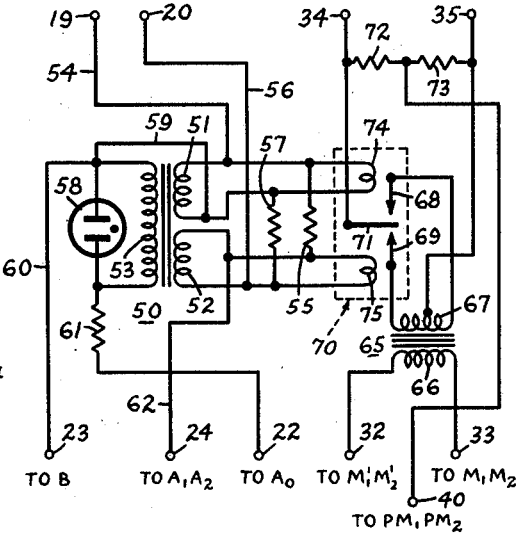
FIG.2.
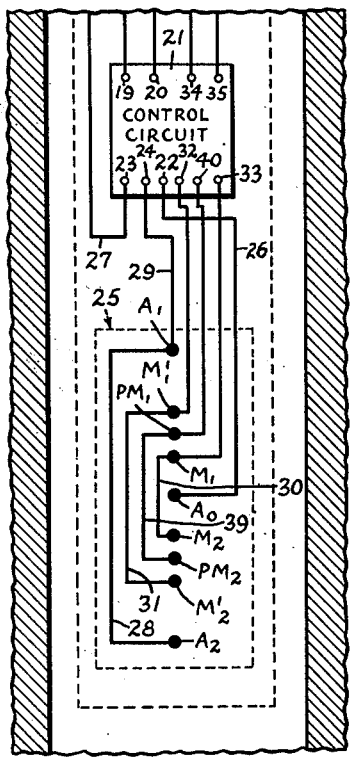
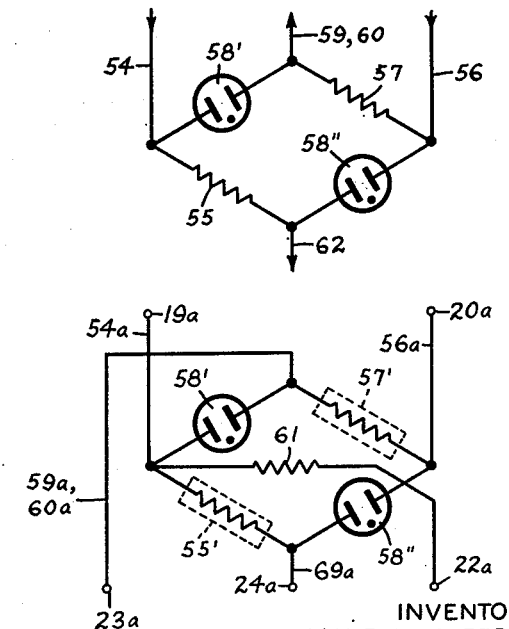
FIG.3.
FIG.4.
INVENTORS.
MAURICE C. FERRE
ARTHUR H. E. HERRALD Feb. 18, 1958    M. C. FERRE ET AL    2,824,279
CONTROL CIRCUIT FOR ELECTRICAL LOGGING APPARATUS
Filed Jan. 19, 1953    2 Sheets-Sheet 2
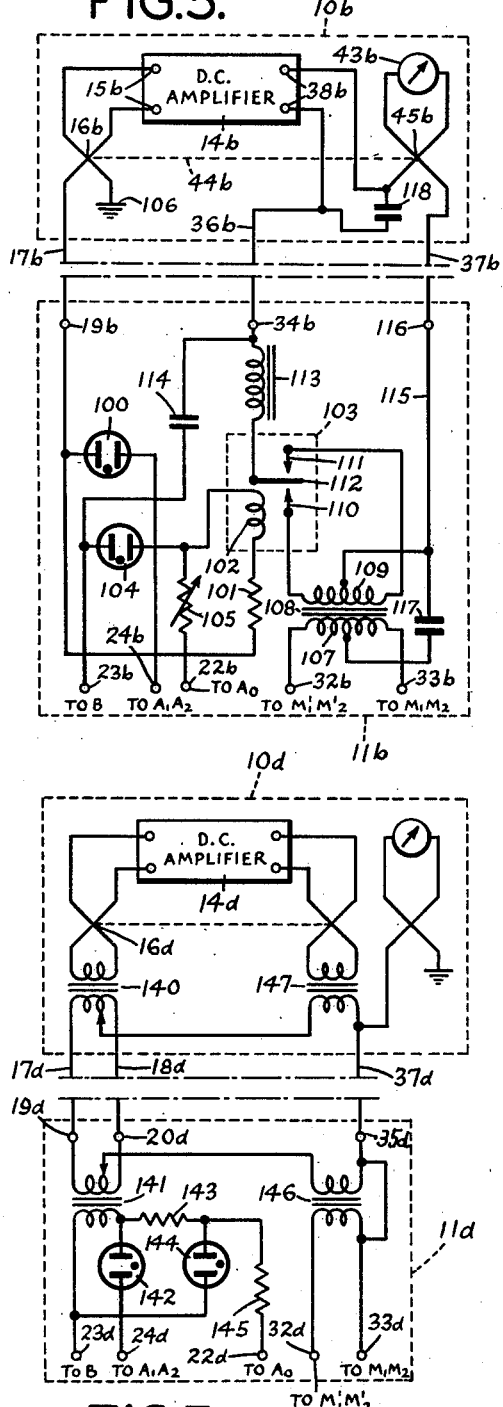
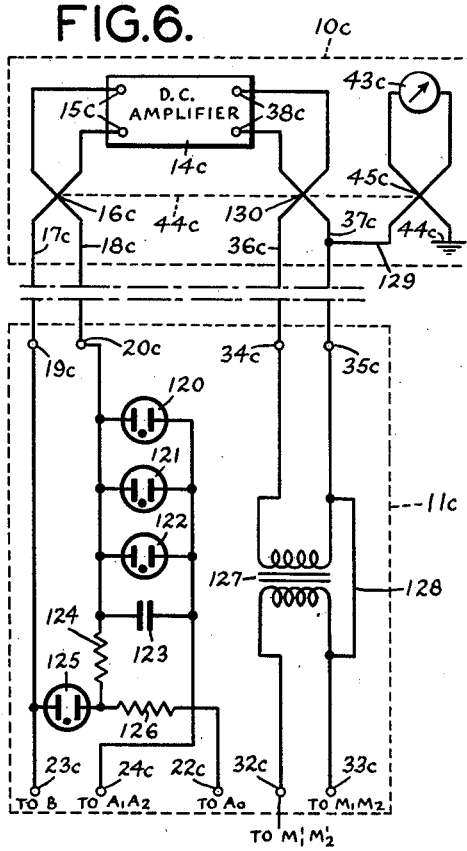
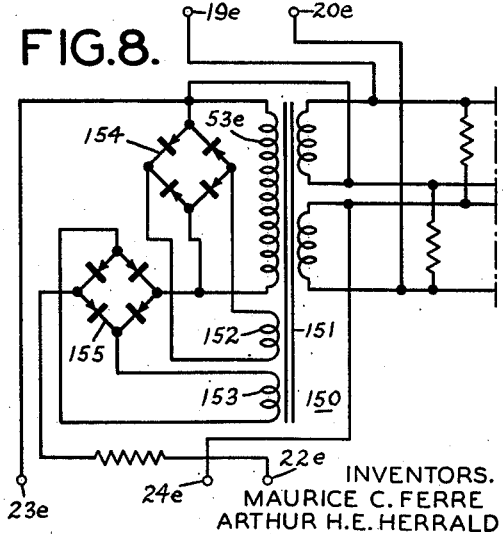
INVENTORS.
MAURICE C. FERRE
ARTHUR H. E. HERRALD
BY
THEIR ATTORNEYS.

2,824,279
CONTROL CIRCUIT FOR ELECTRICAL LOGGING APPARATUS

Maurice C. Ferre and Arthur H. E. Herrald, Ridgefield, Conn., assignors, by mesne assignments, to Schlumberger Well Surveying Corporation, Houston, Tex., a corporation of Texas Application January 19, 1953, Serial No. 331,938

10 Claims. (Cl. 324—1)

This invention relates to electrical logging apparatus and, more particularly, pertains to a novel control circuit for permitting a reduction in the number of electrical conductors extending between a logging instrument adapted to traverse a well bore and associated equipment located at the surface of the earth for a given type of service.

Although subject to a wide variety of applications, the present invention is ideally suited for use with logging apparatus of the type disclosed in the copending application of Henri-Georges Doll, Serial No. 161,641, filed May 12, 1950, now U. S. Patent No. 2,712,627, issued July 5, 1955, and assigned to the same assignee as is the present application. For convenience, it will be described in that connection.

In one form of the apparatus described in the aforementioned Doll application, a plurality of electrodes are adapted to be lowered into a well, while current supply equipment and measuring circuits are disposed at the earth's surface. The electrodes and the surface equipment are interconnected by a multiconductor cable which is also used in the usual manner for lowering and raising the electrodes.

To achieve a desired type of logging, i. e., one capable of depicting thin strata, and more accurately representative of the true formation resistivities than logging techniques utilizing conventional apparatus, a current of constant amplitude is supplied between a central electrode in the well and a ground return while a current of controllable amplitude is applied between a remotely positioned electrode and a pair of auxiliary electrodes disposed in the well on opposite sides of the central electrode. The amplitude of this current is controlled in response to the potential between pairs of monitoring electrodes situated between the central and auxiliary electrodes and a recording instrument is connected between a ground return and a center-tapped resistor, in turn, connected to leads from the monitoring electrodes. It is thus apparent that a minimum of five conductors are needed for operatively connecting the electrodes with the surface equipment.

Moreover, since the power supplied to the principal and auxiliary current electrodes usually is many times greater than that derived at the monitoring or measuring electrodes, precautions must be taken to avoid interaction between the supply and measuring conductors. Such interaction may result in extraneous responses which tend to obscure desired variations of potential in the measuring circuit thereby undesirably reducing the effectiveness of the logging apparatus.

It has been found desirable to utilize the above described logging apparatus in installations provided with interconnecting cables having but four conductors. In other installations in which connecting cables including five or more conductors are available, it may be advantageous to utilize the electrode arrangement described in the aforementioned Doll application together with some other electrode arrangement so that by the use of a multiple recorder a plurality of electrical logs may be derived simultaneously. These situations may be accommodated if the number of conducting wires between the drill hole instrument and the surface equipment for any one type of service can be reduced.

It is, therefore, a principal object of the present invention to provide a novel control circuit for permitting a reduction in the number of electrical conductors extending between the bore hole electrodes and the surface equipment of electrical logging apparatus for a given type of service.

A further object of the present invention is to provide a novel control circuit which allows a reduction in the number of electrical conductors necessary to operate well logging apparatus while minimizing interaction between current supply and measuring circuits.

Another object of the present invention is to provide a novel control circuit for well logging apparatus which is simple and inexpensive to construct and yet is entirely efficient and reliable in operation.

Briefly stated, a control circuit in accordance with the present invention comprises an input circuit for receiving applied power having a variable component, such as current of variable amplitude. A first output circuit is coupled to the input circuit and a regulating device, for example, of the gaseous discharge type, is included in circuit relation with the input circuit and the first output circuit. The gaseous discharge device preferably may be included in series circuit relation with the input and first output circuits and should have an ionization potential such that ionization occurs over an operating range of amplitude values of the applied current, thereby providing power in the first output circuit in which the current has an amplitude corresponding to instantaneous variations in the applied current. A second output circuit is coupled to the regulating device and is adapted to derive power having a component, such as current, of substantially constant amplitude. The output circuits are electrically coupled to electrodes positionable in a drill hole filled with an electrically conductive fluid. Thus, currents of fixed and variable magnitude may flow via selected ones of the electrodes.

The features of the present invention, which are believed to be novel are set forth with particularity in the appended claims. The present invention, both as to its organization and manner of operation, together with further objects and advantages thereof, may best be understood by reference to the following description taken in connection with the accompanying drawings in which:

Fig. 1 is a schematic diagram of an electrical logging system incorporating features disclosed in the aforementioned Doll application and including a control circuit featuring the present invention;

Fig. 2 is a detailed circuit diagram of a control circuit constructed in accordance with the present invention and which may be utilized in the apparatus shown in Fig. 1;

Fig. 3 represents an equivalent circuit for a portion of the circuit shown in Fig. 2; and Figs. 4 through 8 illustrate various modifications of the control circuit shown in Fig. 2.

In Fig. 1 of the drawings there is shown a complete electrical well logging system including surface equipment 10 connected to equipment 11 disposed in a well 12. The well 12 contains a column of substantially conductive liquid 13, such as a water-base drilling mud.

The surface equipment 10 comprises a direct coupled amplifier 14 having its output circuit terminals 15 connected through a conventional polarity reversing commutator 16 to a pair of current supply conductors 17 and 18 that extend into the bore hole 12. These conductors are terminated at the input circuit terminals 19 and 20 of a control circuit 21 embodying the present invention, the details of which will be presented hereinafter in connection with Fig. 2.

The control circuit 21 includes a pair of output circuits, one connected to the terminals 22 and 23, and the other connected to the terminals 23 and 24. The terminal 22 is connected by a conductor 26 that is electrically insulated from the liquid 13 to a principal current electrode $A_0$ included within a primary electrode system 25 that is disposed within the bore hole 12. The output terminal 23 is connected by an insulated conductor 27 to an electrode B that is movable simultaneously with the primary electrode system 25, but is positioned above it in the bore hole 12. As will be explained hereinafter, in response to the supply current in the leads 17 and 18, a current of constant peak amplitude is caused to flow from the electrodes $A_0$ and B through the formations traversed by the bore hole 12.

A pair of auxiliary current electrodes $A_1$, $A_2$ are disposed in the bore hole 12 above and below the principal current electrode $A_0$. The auxiliary electrodes are connected together by an insulated conductor 28 and to the output terminal 24 of the control circuit 21 by a conductor 29. As will be later shown, a current of controllable amplitude, derived from the current supplied over the conductors 17 and 18, is caused to flow through the earth formations between the electrodes $A_1$—$A_2$ and B.

In order to determine the amount of current supplied to the auxiliary current electrodes, the electrode system 25 also includes a plurality of monitoring electrodes $M_1$, $M_1'$, $M_2$, and $M_2'$. The electrode $M_1$ is disposed between the electrodes $A_0$ and $A_1$ and is connected by an insulated conductor 30 to the electrode $M_2$ that is correspondingly positioned between the electrodes $A_0$ and $A_2$. The electrode $M_1'$ is disposed between the electrode $M_1$ and the electrode $A_1$ and is connected by an insulated conductor 31 to the electrode $M_2'$ which is correspondingly positioned between the electrodes $M_2$ and $A_2$. The electrodes $M_1$, $M_2$ and $M_1'$, $M_2'$ are connected to additional input terminals 32 and 33 of the control circuit 21 which, in turn, are coupled to another pair of output terminals 34 and 35 through a circuit to be described hereinafter. The latter terminals are connected by leads 36 and 37 that extend through bore hole 12 to the input circuit terminals 38 of the amplifier 14. Thus, the potential between the interconnected pairs of monitoring electrodes determines the input potential applied to the amplifier 14 and controls the output current supplied by the amplifier over the leads 17 and 18.

To make resistivity measurements, the electrode system 25 also includes measuring electrodes $PM_1$ and $PM_2$ each disposed between one pair of adjacent monitoring electrodes and connected to one another by an insulated conductor 39. The measuring electrodes are connected to a terminal 40 of the control circuit 21 and, as will be later shown, the measured potential appears at the leads 36 and 37. A pair of resistors 41 and 42, preferably of equal resistance value, are connected in series and between the leads 36 and 37. The junction of these resistors is connected to one terminal of a recording galvanometer 43, the other terminal of which is connected to ground at 44.

A current reversing commutator 45 is interposed in the leads to the galvanometer 43 and is synchronously operated with the commutator 16, as illustrated by a dash-line connection 46. The commutator 45 rectifies the applied square wave potential so that a unidirectional potential is supplied to the galvanometer 43.

Thus, as the equipment 11 traverses the drill hole 12, continuous indications are made by the meter 43 which preferably is calibrated to read directly in terms of resistivity.

Neglecting for the moment the circuit and operational details of control circuit 21, the arrangement just described comprises, in general, an electrical logging system of the type disclosed in the aforementioned Doll application. The operation of such a system is fully presented in that application so that a detailed description thereof is unnecessary.

In brief, however, current of rectangular wave form and essentially constant maximum amplitude flows into the earth formations from the electrode $A_0$ and current of corresponding waveform, but of variable amplitude flows through the auxiliary electrodes $A_1$, $A_2$. The current flow at the principal and auxiliary electrodes is poled so that current from the principal electrode $A_0$ flows substantially transversely therefrom relatively to the axis of the bore hole 12.

If any potential difference exists between the electrodes $M_1$, $M_1'$ and $M_2$, $M_2'$, it is converted to a unidirectional potential by the control circuit 21 and supplied over the conductors 36 and 37 to the input circuit terminals 38 of the amplifier 14. The magnitude of this potential difference determines the amplitude of the current supplied from the output terminals 15 through the commutator 16 and the leads 17 and 18 to the control circuit, and a current of controllable magnitude flows between the electrodes $A_1$, $A_2$ and B. The magnitude and polarity of the current supplied from the output terminals 15 of the amplifier 14 is always such that the potential difference between the monitoring electrodes $M_1$, $M_1'$ and $M_2$, $M_2'$ is maintained substantially at zero.

It is, therefore, apparent that by maintaining the potential difference between the monitoring electrodes essentially at zero, current flow from the principal electrode $A_0$ is maintained in a direction substantially transverse to the axis of the bore hole 12. Accordingly, as the equipment 11 traverses the well bore, potential variations between the measuring electrodes $PM_1$, $PM_2$ and ground 44, as recorded by the meter 43, are accurately indicative of the true resistivity of the earth formations although the latter may be relatively thin. Moreover, the influence of the mud column 13 on the resistivity measurements is practically negligible.

Turning now to the detailed circuit diagram of the control circuit 21 represented in Fig. 2, it will be observed that the terminal designations therein correspond to those of Fig. 1.

In the current supply portion of the control circuit 21, at the left side of the figure, there is included a transformer 50 provided with a pair of similar primary windings 51 and 52, having substantially the same number of turns, and a secondary winding 53, having many more turns than either primary winding. One side of the primary winding 51 is connected by a lead 54 to the input terminal 19 and is connected to one side of the primary winding 52 by a resistor 55. The remaining side of the primary winding 52 is connected to the input terminal 20 by a lead 56 and to the remaining side of the primary winding 51 by a resistor 57 having a resistance value preferably equal to that of the resistor 55.

The primary windings 51 and 52, included in an input circuit for the control equipment 21, are similarly poled so that in response to square wave current flow therein, over the leads 54 and 56, a voltage is induced in the secondary winding 53 and applied to a regulator device 58, preferably of the gaseous discharge type, connected in shunt with the winding 53. The device 58 has an ionization potential such that it remains ionized over a normal operating range of current amplitude variations in the primary windings 51—52.

One terminal of the device 58 is connected by a lead 59 to the junction of the primary winding 51 and the resistor 57 and also by a lead 60 to the terminal 23 (connected to the electrode B). The other terminal of the device 58 is connected through a resistor 61 to a terminal 22 (connected to the electrode $A_0$). A lead 62 connects the junction of the primary winding 52 and the resistor 55 with the terminal 24 (connected to the electrodes $A_1$, $A_2$).

In operation, the gaseous discharge device 58 remains ionized over the entire range of variations in amplitude of the current square wave applied to the primary windings 51—52. As is well known, the voltage drop across the gaseous discharge device in that condition remains constant over a wide range of current variations. The resistor 61 preferably has a very high resistance value as compared to the resistance of the earth formations to be measured and, accordingly, current of constant maximum amplitude flows through the formations through an output circuit for the control device 21 that is connected to the terminals 23 and 22 (electrodes B and $A_0$). Thus, the requirement for constant current flow at the principal electrode is met by the circuit arrangement of Fig. 2.

If the transformer 50 may be considered to be a perfect transformer, i. e., it is a perfect translator of applied signals and exhibits substantially no losses, it may be disregarded for circuit analysis purposes. Also, if a pair of series connected secondary windings are substituted for the secondary winding 53 and each is connected across a respective gaseous discharge device, the circuit remains substantially unchanged. Therefore, in view of these assumptions, the circuit of Fig. 3 is equivalent to the corresponding portion of the circuit of Fig. 2 and corresponding elements are represented by the same reference characters.

It will be observed that a four-arm bridge is formed including the resistors 55 and 57 in alternate arms and the gaseous discharge devices 58' and 58" in the remaining pair of alternate arms. The leads 54 and 56 are connected to one pair of opposite junctions and the leads 59 and 62 are connected to the remaining pair of junctions in another output circuit for the control device 21. As pointed out above, the gaseous discharge device 58 remains ionized over the operating range of applied current amplitude, hence the voltage drops across the devices 58' and 58" are constant.

At some amplitude of the applied current, the voltage drop across the resistor 57 is equal to the voltage drop across the gaseous discharge device 58'. Similarly, at the same current value, the voltage drop across the resistor 55 is equal to the voltage drop across the gaseous discharge device 58". Under these conditions, the potential difference between the conductors 59 and 62 is obviously zero. Now if the current supplied over the conductors 54 and 56 is increased, the voltage drop across the resistor 57 increases as does the voltage drop across the resistor 55 increase; but the voltage drop across the gaseous discharge devices remains practically constant, as is well known. Since these resistors are in alternate arms of the bridge circuit, the bridge thus becomes unbalanced and a potential difference appears between the conductors 59 and 62. The magnitude of this potential difference increases directly with an increase in the current supplied over the conductors 54 and 56, and the current applied through the leads 60 and 62 to the electrodes B and $A_1$, $A_2$ varies accordingly.

It is, therefore, evident that while a current of constant amplitude is supplied through the terminals 23 and 22 to the electrodes $A_0$ and B, a current of adjustable amplitude is applied over the terminals 23 and 24 to the electrodes B and $A_1$, $A_2$. This meets the requirements for the current supply circuit of the logging system shown in Fig. 1 while utilizing only two conductors (17 and 18) connecting the surface equipment 10 with the bore hole equipment 11.

The control circuit 21 illustrated in Fig. 2 also includes an arrangement for reducing the number of conductors required in the monitoring and measuring portion of the system. This includes a transformer 65, shown at the right side of the figure, having its primary winding 66 connected to the terminals 32 and 33 (that are in turn connected to the monitoring electrodes). The secondary winding 67 of the transformer 65 is connected to the fixed contacts 68 and 69 of a single pole-double throw relay 70 of the polarized type and it has a center tap connected to the terminal 35. The movable contact 71 of the relay is connected to the terminal 34. A pair of resistors 72, 73 of like resistance value are connected in series between the terminals 34 and 35 and the junction of the resistors is connected to the terminal 40 (that is, in turn, connected to the measuring electrodes $PM_1$, $PM_2$).

The relay 70 includes a pair of actuating windings 74 and 75 respectively connected to the primary windings 51 and 52 of the transformer 50. The actuating windings 74 and 75 are poled to operate in unison on the movable arm 71 of the relay and the relay is of the type adapted to respond very quickly to an applied alternating potential. Thus, the relay arm 71 is operated in synchronism with the undulations of the square wave of current applied over the leads 54 and 56 and it operates as a synchronous, full-wave rectifier for the square wave potentials intercepted by the monitoring electrodes and applied to the relay contacts from the transformer 65. Thus, a unidirectional potential is supplied over the terminals 34 and 35 and the leads 36 and 37 to the input circuit 38 of the D. C. amplifier 14 (Fig. 1).

Since the measuring electrodes $PM_1$, $PM_2$ are connected to the junction of the resistors 72 and 73, the square wave potential variations derived at the measuring electrodes are supplied over the leads 36 and 37, acting as a single conductor. As pointed out in connection with Fig. 1, the derived potential is applied to the galvanometer 43 over the resistors 41 and 42 in conjunction with ground connection 44.

It is evident that, by supplying the monitoring signal as a unidirectional potential and employing an undulating measuring potential, the number of conductors required is less than needed heretofore.

Moreover, since the entire current supply between the surface equipment 10 and the bore hole apparatus 11 is carried by a pair of conductors 17 and 18 that may be physically and electrically balanced relatively to the conductors 36 and 37, operatively considered as a single conductor or as a pair, interaction between the current supply and the sensitive monitoring and measuring circuits is minimized.

In addition, from an inspection of Fig. 2, it may be seen that the control circuit 21 is comprised of few components and is relatively simple to construct. Thus, the unit not only is physically small, but the possibilities of equipment failures are minimized. These desirable characteristics are realized while at the same time maintaining the efficiency and reliability of the electrical logging system incorporating the control circuit.

A practical circuit similar to that of Fig. 3 may be actually utilized in connection with the arrangement of Fig. 2. This is illustrated in Fig. 4 in which elements that correspond to those shown in Fig. 3 are represented by the same reference characters. It has been determined that the modified type of circuit requires a greater average current value than the one shown in Fig. 2 and a supply potential at least equal to twice the ionization potential of one gaseous discharge device. Thus, in some applications, in order to derive a great enough variation in current amplitude at the terminals 23a and 24a, the bridge resistors 55' and 57' may be of the nonlinear type having a resistance value that increases with the applied current. For example, resistors of low thermal inertia and a high positive temperature coefficient of resistance may be employed. One such device is comprised of an iron or tungsten filament in an evacuated chamber.

Thus, the resulting change in voltage drop across each resistor for a variation in applied current is greater than that provided by linear elements. Of course, any other equivalent type of nonlinear element may be utilized in this connection.

In the modification of the present invention shown in Fig. 5, only three cable conductors are required to couple surface equipment 10b with drill hole equipment 11b. There is provided a direct coupled amplifier 14b having one of its output terminals 15b grounded at 106 and the other connected by a lead 17b to the terminal 19b of the bore hole equipment 11b. A first gaseous discharge device 100 is connected between the terminal 19b and the terminal 24b (that is connected to the electrodes $A_1$, $A_2$). The terminal 19b is also connected through a series resistor 101 to the operating winding 102 of a synchronous relay 103. The winding 102, in turn, is connected through a second gaseous discharge device 104 to the terminal 23b (that is connected to electrode B). Preferably, the device 104 has lower ignition and conduction potentials than does the device 100. The junction of the winding 102 and the device 104 is connected through a variable resistor 105 having a large resistance value to the terminal 22b (that is connected to the electrode $A_0$).

In the operation of the current supply portion of the control circuit just described, both of gaseous discharge devices 100 and 104 are ionized over the entire range of current variations supplied by the D. C. amplifier 14b. Current from the amplifier flows over the conductor 17b, the resistor 101, the winding 102 and the gaseous discharge device 104 to the electrode B and returns through the ground 106 to the amplifier. Since the voltage drop across the gaseous discharge device 104 is fixed and the resistor 105 is of high resistance value, current of substantially constant amplitude is applied to the electrode $A_0$ and returned through the earth formations to the electrode B. Moreover, in its ionized condition, the resistance of the gaseous discharge device 100 is negligible and current variations applied over the lead 17b flow through that device, the electrodes $A_1$, $A_2$ and the earth formations to the electrode B. It is thus apparent that the required constant and variable currents are supplied to the electrode system.

The monitoring electrodes $M_1$, $M_2$ and $M_1'$, $M_2'$ are connected to the primary winding 107 of a transformer 108 having its secondary winding 109 connected to the fixed contacts 110, 111 of the relay 103. The movable contact 112 of the relay is connected to the terminal 34b through a blocking choke 113 which attenuates alternating potentials at the frequency produced by the commutator 16b, but permits the passage to the input circuit 38b of the amplifier 14b of the slowly-varying rectified components provided by the synchronous rectifier 103. A return path for the rectified, monitoring potentential is provided by a center tap of the secondary winding 109, a lead 115, a terminal 116 and galvanometer 43b. Thus, the potential at the monitoring electrodes is rectified and applied to the input circuit of the amplifier 14b.

The arrangement of Fig. 5 is such that the electrodes $PM_1$ and $PM_2$ (Fig. 1) are not required in the measuring circuit, their function being performed by the monitoring electrodes. For this purpose, a coupling condenser 117 connects a center tap of the primary winding 107 to a center tap of the secondary winding 109 of the transformer 108 thereby affording an alternating potential path to the commutator 45b through the lead 37b. The return alternating potential path from the commutator is provided by a coupling condenser 118 shunted across the terminals 38b, the lead 36b, the terminal 34b and a coupling condenser 114 to the terminal 23b (electrode B). Thus, the measuring equipment effectively uses the same electrodes ($M_1$, $M_2$ and $M_1'$, $M_2'$) and the same leads (36b, 37b) as are employed for the monitoring circuit. Rectification occurs in the synchronous commutator 45b in the surface equipment and a unidirectional potential is supplied to the meter 43b. The choke coil 113 prevents the passage of alternating potential from the condenser 114 to the monitoring circuit through the contacts of relay 103.

In the modified arrangement shown in Fig. 6, the output circuit terminals 15c of the D. C. amplifier 14c are coupled through the synchronous commutator 16c and the leads 17c and 18c to the terminals 19c and 20c of the control unit portion of the bore hole equipment 11c. The terminal 19c is connected directly to the terminal 23c (in turn connected to the electrode B) and the terminal 20c is connected through three parallel connected gaseous discharge devices 120, 121, and 122 to the terminal 24c (in turn connected to the electrodes $A_1$, $A_2$). The devices 120–122 are shunted by a by-pass condenser 123 and the terminal 20c is further connected through a resistor 124 to one terminal of a fourth gaseous discharge device 125, the remaining terminal of which is connected to the terminal 23c. The junction of the resistor 124 and the device 125 is connected through a resistor 126 of high resistance value to the terminal 22c (connected to the electrode $A_0$).

In operation, the devices 120–122 and 125 are continuously in ionized condition and, since a constant voltage drop appears across the device 125, current of constant amplitude is supplied over the high resistance 126 to the electrode $A_0$.

The gaseous discharge devices 120–122 have a very low resistance and the terminals 20c and 24c are effectively connected together. Thus, current variations in the output circuit of the amplifier 14c, transmitted over the conductors 17c and 18c are applied to the electrodes B and $A_1$, $A_2$.

The monitoring potential at the electrodes $M_1'$, $M_2'$, and $M_1$, $M_2$ is applied over a transformer 127, the terminals 34c, 35c and the leads 36c, 37c to the input circuit 38c of the amplifier 14c through a polarity-reversing commutator 130 that is synchronized with the commutators 16c and 45c.

In the measuring circuit, a connection 128 extends from one side of the primary winding of the transformer 127 to one side of its secondary winding. A connection 129 from the lead 37 and a ground connection 44c through the synchronous commutator 45c, provide a circuit to the galvanometer 43c. Thus, at least one of the monitoring electrodes is used for measuring purposes and the meter 43 records formation resistivities.

The modified arrangement of Fig. 7 is generally similar to that represented in Fig. 6, one difference being that the monitoring circuit is combined with the current supply circuit so that three instead of four cable conductors are required.

To this end, the output current of the amplifier 14d is converted by a synchronous chopper or commutator 16d and applied to the primary winding of a transformer 140, the secondary winding of which is connected by leads 17d and 18d to the terminals 19d and 20d of the bore hole equipment 11d. From these terminals, current is supplied to the primary winding of a transformer 141 having one side of its secondary winding connected directly to the terminal 23d and the other side connected to the terminal 24d through a gaseous discharge device 142. The last-mentioned terminal of the secondary winding is connected through a resistor 143 to another gaseous discharge device 144 which in turn is connected to the terminal 23d. The junction of the resistor 143 and the device 144 is connected through a resistor 145 having a high resistance value to the terminal 22d.

From the above discussion of Fig. 6, it is evident that the required currents of fixed and variable amplitudes are supplied to the electrodes $A_0$ and $A_1$, $A_2$, respectively.

The monitoring electrodes are connected to the terminals 32d and 33d which, in turn, are connected to the primary winding of a transformer 146. One side of the secondary winding of the transformer is connected to a terminal 35d and the other side is connected to a center tap of the primary winding of the transformer 141. The conductor 37d connects the terminal 35d with one side of the primary winding of a transformer 147 included in the surface equipment 10d. The remaining side of the transformer primary winding is connected to a center tap of the secondary winding of the transformer 140. It is thus apparent that the monitoring circuit is completed by effectively "phantoming" one lead of the monitoring circuit with the current supply circuit.

In Fig. 8 there is illustrated an alternative type of regulating circuit which may be substituted in the arrangement represented in Fig. 2. Generally stated, the modified arrangement includes a saturable reactor which takes the place of the gaseous discharge type regulators illustrated in connection with the various embodiments described above. The transformer 50 of Fig. 2 is replaced by a similar transformer 150 that is provided with a core 151 having the required saturation characteristics. The secondary winding 53e of the transformer is connected in the same manner as shown in Fig. 2, and the transformer includes two additional secondary windings 152 and 153. The winding 152 is supplied with a unidirectional potential derived by a bridge rectifier circuit 154 that is connected in parallel relation with the secondary winding 53e, and the winding 153 is supplied with a unidirectional potential derived from a bridge rectifier circuit 155 interposed in series circuit relation with the secondary winding 53e. The applied potentials at the windings 152 and 153 are of such polarity and magnitude that the resulting magnetic flux causes the core of the transformer 150 to operate in the saturated region thereby providing a constant voltage at the secondary winding 53e over a range of amplitude values of the potential applied at the terminals 19e, 20e. A similar form of saturable-reactor regulator is described in the copending application of Y. A. Rocard, filed October 29, 1949, and assigned the Serial No. 124,315.

It may be thus seen that the control circuit in accordance with the present invention may utilize any of a variety of regulating devices, such as of the gaseous discharge or saturable reactor types.

Although the instant invention has been described in association with an electrical logging system of the type disclosed in the aforementioned application of Henri-Georges Doll, it may also be suitably employed in other environments. For example, a control circuit embodying the present invention may be used to advantage in systems described in any of the following copending applications of Henri-Georges Doll, each of which is assigned to the same assignee as is the present application: application Serial No. 211,788, filed February 19, 1951, now U. S. Patent No. 2,712,628, issued July 5, 1955; application Serial No. 214,273, filed March 7, 1951, now U. S. Patent No. 2,712,629, issued July 5, 1955; and application Serial No. 257,348, filed November 20, 1951, now U. S. Patent No. 2,712,630, issued July 5, 1955. In each of the disclosed equipments, constant and adjustable currents are supplied to an electrode system and the manner of utilizing the control circuit of the instant invention for permitting a reduction in the number of required conductors is obvious in the light of the foregoing disclosure.

Also, it is possible to derive a variety of fixed components of power by employing circuits embodying the present invention. For example, with reference to Fig. 2, if current of great enough amplitude is supplied at the terminals 19 and 20, a sufficiently high step-up turns ratio may be utilized for the secondary winding 53 of the transformer 50 to energize a pair of gaseous discharge devices in series, or each of a pair of secondary windings may be connected to one device. Thus, potentials of different amplitudes may be obtained by connections to the transformer secondary winding. These voltages may be utilized directly, if constant voltages are required for a particular electrode arrangement, or constant current can be derived through the use of resistors, such as the resistor 61, of high resistance value.

Alternatively, where a form of square wave multiplexing is used in the logging apparatus, i. e., two or more time-displaced rectangular wave currents are supplied to an electrode system for simultaneously affecting a plurality of measurements, a fixed current may be derived in response to each current. For example, a relay device may be employed selectively to switch the current supply conductors from one gaseous discharge device to another in response to the applied current wave.

Moreover, although supplied power of rectangular wave form has been illustratively described, other wave forms, such as of sinusoidal shape may be utilized. Of course, in certain cases a unidirectional power supply may be employed.

While particular embodiments of the present invention have been shown and described, it is to be understood that various modifications thereof may be made without departing from the invention, and it is, therefore, aimed in the appended claims to cover all such changes and modifications as fall within the true spirit and scope of the invention.

We claim:

1. In electrical power supply apparatus, the combination of nonlinear electrical regulating means for maintaining a component of applied electrical power at a substantially constant amplitude for at least a range of variations in said applied power and at least two linear circuit elements, circuit means for operatively coupling said nonlinear electrical regulating means and said linear circuit elements in an electrical bridge relation having apices forming two diagonals with the linear circuit elements in alternate arms of the bridge and said nonlinear electrical regulating means coupled in the remaining alternate arms of the bridge, input circuit means connected to two opposite apices forming one diagonal of said bridge and adapted to receive applied electric power having a variable component, first output circuit means connected in parallel with said nonlinear electrical regulating means for providing power having a component of substantially constant amplitude over an operating range of amplitudes of the variable component of said applied electric power, and second output circuit means connected to the two apices of said bridge forming the second diagonal thereof for providing power having a component varying substantially in accordance with the variable component of said applied power.

2. In electrical power supply apparatus, the combination of transformer means having at least two primary windings and one secondary winding, ionizable gas discharge means connected across said secondary winding, a pair of linear circuit elements connected to the primary windings of said transformer means to form a bridge having apices forming two diagonals with said linear circuit elements in alternate arms of the bridge, input circuit means connected to two apices forming one diagonal of said bridge and adapted to receive applied electric power having a variable component, first output circuit means connected to the secondary winding of said transformer means, and second output circuit means connected to the two apices of said bridge forming the second diagonal thereof for providing power having a component varying substantially in accordance with the variable component of said applied power.

3. In electrical power supply apparatus, the combination of transformer means having a saturable core, at least two primary windings and a secondary winding, a pair of linear circuit elements connected to said primary windings to form a bridge having apices constituting two diagonals with said linear circuit elements in alternate arms of the bridge, input circuit means connected to two apices of said bridge forming one diagonal thereof and adapted to receive applied power having a variable component, unilaterally conductive electrical means connected to the secondary winding of said transformer means, coil means responsive to the output of said unilaterally conductive means for controlling the degree of magnetization of said saturable core, first output circuit means connected to the secondary winding of said transformer means, and second output circuit means connected to the two apices of said bridge constituting the second diagonal thereof.

4. In well logging apparatus, the combination of a plurality of electrodes mounted in fixed relation for movement through a well spaced apart longitudinally with respect to the axis of the well, electrical energy source means responsive to the potential difference between two of said electrodes for providing a power output having a component varying in accordance with said potential difference, input circuit means connected to receive the power output from said source means, first output circuit means connected to one of said electrodes and to ground, nonlinear circuit means common to said input circuit means and first output circuit means for providing power having a component of substantially constant amplitude to said one electrode, second output circuit means connected in series with said input circuit means and to another of said electrodes for supplying power thereto having a component varying in accordance with the variable component of said applied power, and means for obtaining indications of the potential difference between a reference point and a point in the vicinity of said two electrodes.

5. In well logging apparatus, the combination of a plurality of electrodes mounted in fixed relation for movement through a well spaced apart longitudinally with respect to the axis of the well, electrical energy source means responsive to the potential difference between two of said electrodes for providing a power output having a component varying in accordance with said potential difference, transformer means having at least two primary windings and a secondary winding, ionizable gas discharge means connected across said secondary winding, first output circuit means connecting said secondary winding between one of said electrodes and ground, a pair of linear circuit elements connected to said two primary windings to form a bridge having apices constituting two diagonals with said linear circuit elements in alternate arms of the bridge, input circuit means connecting the output of said source means to two apices forming one diagonal of the bridge, second output circuit means connecting the two apices of the bridge forming the second diagonal thereof to at least one of said electrodes and ground, and means for obtaining indications of the potential difference between a reference point and a point in the vicinity of one of said two electrodes.

6. In well logging apparatus, the combination of a plurality of electrodes mounted in fixed relation for movement through a well spaced apart longitudinally with respect to the axis of the well, amplifier means having input terminals and output terminals, transformer means having at least two primary windings and one secondary winding, ionizable gas discharge means connected to said secondary winding, first output circuit means connecting said secondary winding to one of said electrodes and to ground, a pair of linear circuit elements connected to said two primary windings to form a bridge having apices forming two diagonals with said linear circuit elements in alternate arms thereof, input circuit means connecting the output terminals of said amplifier means to two apices of said bridge forming one diagonal thereof, periodically operable current reversing means in said input circuit means, second output circuit means connecting the two apices forming the second diagonal of said bridge to one of said electrodes and to ground, monitoring circuit means connecting two of said electrodes to the input terminals of said amplifier means, means operable in synchronism with said current reversing means for rectifying signals in said monitoring circuit means, and means for obtaining indications of the potential difference between a reference point and a point in the vicinity of said two electrodes.

7. In well logging apparatus, the combination of a plurality of electrodes mounted in fixed relation for movement through a well spaced apart longitudinally with respect to the axis of the well, amplifier means having input terminals and output terminals, means for periodically reversing the output of said amplifier means, means grounding one of said amplifier output terminals, ionizable gas discharge means connected to one of said electrodes and a ground electrode, first conductor means connecting said one electrode to the other output terminal of said amplifier means, second ionizable gas discharge means connected to said first conductor means and to another of said electrodes, transformer means having a primary winding connected to two monitoring electrodes and having a tapped secondary winding, second conductor means connecting the tap on said secondary winding to one input terminal of said amplifier means, third conductor means connected to the other input terminal of said amplifier means, switching means responsive to the current in said first conductor means for connecting the free end of said third conductor means alternately to the respective terminals of said secondary winding, electrical indicating means, circuit means including said second and third conductor means for connecting said indicating means to receive the potential at a point in the vicinity of said monitoring electrodes, and means operated in synchronism with said reversing means for periodically reversing the connections between said circuit means and said indicating means.

8. In well logging apparatus, the combination of a plurality of electrodes mounted in fixed relation for movement through a well spaced apart longitudinally with respect to the axis of the well, amplifier means having input terminals and output terminals, first ionizable gas discharge means connected to one of said electrodes and to a ground electrode, resistance means interposed between said gas discharge means and said one electrode, first conductor means connecting said ground electrode to one output terminal of said amplifier means, second conductor means connecting the other output terminal of said amplifier means to the junction of said gas discharge means and said resistance means, first periodically operable means for reversing the connections between said first and second conductor means and the output terminals of said amplifier means, second ionizable gas discharge means connected to said second conductor means and to another of said electrodes, transformer means having a primary winding connected to two monitoring electrodes and having a secondary winding, third and fourth conductor means connecting said secondary winding to the input terminals of said transformer means, second means periodically operable in synchronism with said first reversing means for reversing the connections between said third and fourth conductors and the input terminals of said amplifier means, electrical indicating means, circuit means including one of said third and fourth conductor means for connecting said indicating means to one of said monitoring electrodes and to ground, and third means periodically operable in synchronism with said first reversing means interposed between said circuit means and said indicating means.

9. In well logging apparatus, the combination of a plurality of electrodes mounted in fixed relation for movement through a well spaced apart longitudinally with respect to the axis of the well, amplifier means having input terminals and output terminals, first transformer means having a secondary winding connected to one of said electrodes and to a ground electrode, first ionizable gas discharge means interposed between said secondary winding and said one electrode, second ionizable gas discharge means connected across said secondary winding, resistance means interposed in series with said second gas discharge means, means connecting the junction of said second gas discharge means and said resistance means to another of said electrodes, second resistance means interposed between said another electrode and said connecting means, second transformer means having a primary winding connected to the output terminals of said amplifier means and having a tapped secondary winding, first and second conductor means connecting the primary winding of said first transformer means to the secondary winding of said second transformer means, first periodically operable means for reversing the connections between the primary winding of said second transformer means and the output terminals of said amplifier means, third transformer means having a primary winding connected to two monitoring electrodes and having a secondary winding, fourth transformer means having a secondary winding connected to the input terminals of said amplifier means and having a primary winding, second means operated periodically in synchronism with said first reversing means for reversing the connections between the secondary winding of said fourth transformer and the input terminals of said amplifier means, third conductor means connecting one terminal of the primary winding of said fourth transformer means to one terminal of the primary winding of said third transformer means, means connecting the other terminal of the primary winding of said fourth transformer means to the tap on the secondary winding of said second transformer means, means connecting the other terminal of the secondary winding of said third transformer means to the tap on the primary winding of said first transformer means, electrical indicating means, circuit means including said third conductor means connecting said indicating means to ground and to one of said monitoring electrodes, and third means periodically operable in synchronism with said first reversing means for reversing the connections between said circuit means and said indicating means.

10. In electrical power supply apparatus, the combination of at least two ionizable gas discharge means and at least two nonlinear circuit elements connected to form a bridge having apices forming two diagonals with the nonlinear circuit elements in alternate arms of the bridge, input circuit means connected to two opposite apices forming one diagonal of said bridge and adapted to receive applied electric power having a variable component, first output circuit means connected to one of said ionizable gas discharge means for providing power having a component of substantially constant amplitude over an operating range of amplitudes of the variable component of said applied electric power, and second output circuit means connected to the two apices of said bridge forming the second diagonal thereof for providing power having a component varying substantially in accordance with the variable component of said applied power.

References Cited in the file of this patent

UNITED STATES PATENTS

| | | |
|---|---|---|
| 2,407,853 | Smith | Sept. 17, 1946 |
| 2,466,299 | Blols | Apr. 5, 1949 |
| 2,664,540 | Beszedies | Dec. 29, 1953 |